Figure 1:
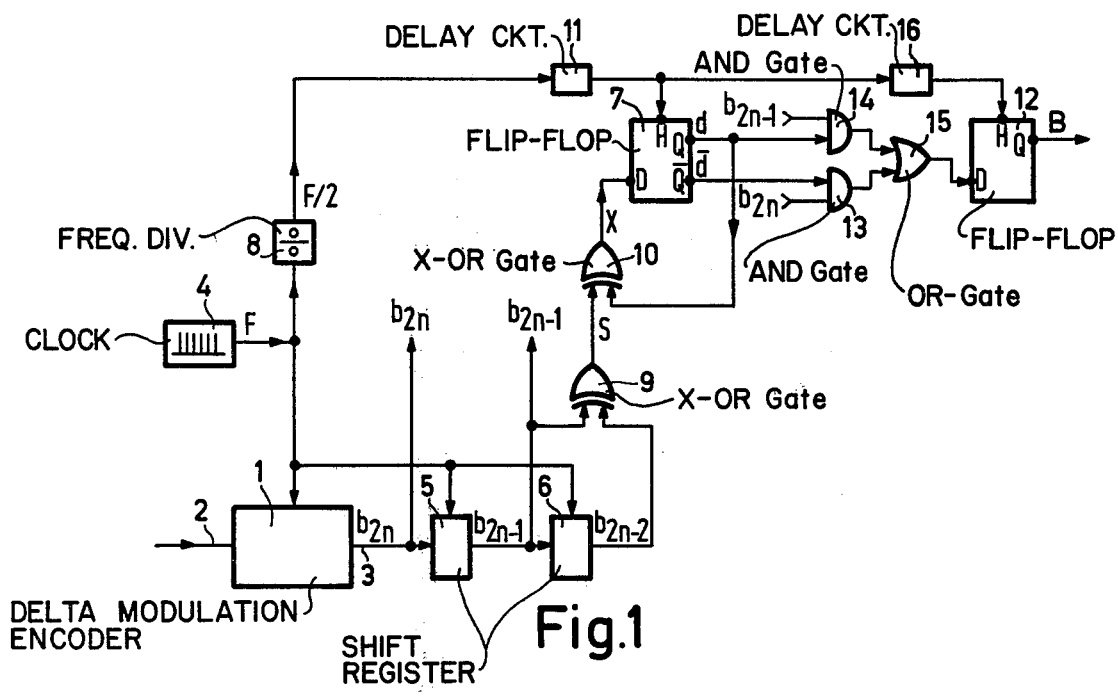

United States Patent [19]

Ferrieu et al.

[11] 4,184,150
[45] Jan. 15, 1980

[54] CIRCUIT ARRANGEMENT FOR HALVING THE SAMPLING RATE OF A DELTA MODULATION SIGNAL

[75] Inventors: Gilbert M. M. Ferrieu, Bievres; Pierre L. V. Breant, Clamart, both of France

[73] Assignee: Telecommunications Radioelectriques et Telephoniques TRT, Paris, France

[21] Appl. No.: 925,779

[22] Filed: Jul. 18, 1978

[30] Foreign Application Priority Data

Aug. 3, 1977 [FR] France .............................. 77 23896

[51] Int. Cl.$^2$ .............................................. G06F 5/06
[52] U.S. Cl. ........................... 340/347 DD; 325/38 B
[58] Field of Search .............. 340/347 DD; 325/38 R, 325/38 B; 332/11 D; 179/15 BV; 364/200, 900

[56] References Cited

U.S. PATENT DOCUMENTS

| | | | |
|---|---|---|---|
| 3,766,542 | 10/1973 | Tomozawa | 340/347 DD |
| 3,930,121 | 12/1975 | Mathiesen | 340/347 DD |
| 3,937,897 | 2/1976 | Song | 332/11 D |
| 4,002,981 | 1/1977 | Eggermont | 325/38 B |

*Primary Examiner*—Charles D. Miller
*Attorney, Agent, or Firm*—Thomas A. Briody; William J. Streeter; Edward W. Goodman

[57] ABSTRACT

This circuit arrangement, which is connected to a delta modulation encoder operating with a sampling rate F and producing a first delta modulation signal, comprises means for producing the two bits $b_{2n-1}$, $b_{2n-2}$ which in this first signal precede each of the bits $b_{2n}$ occurring at the instants 2nT and having a rate F/2, a first flip-flop which is controlled at said instants 2nT for maintaining or not maintaining the state thereof, depending on whether the two above-mentioned bits $b_{2n-1}$, and $b_{2n-2}$ are identical or not, a second flip-flop to which the output signal of the first flip-flop is applied through a logic circuit, and which assumes either the state of the above-mentioned bit $b_{2n}$ or the state of the bit $b_{2n-1}$, depending on whether the first flip-flop is in the one or in the other state. The output of this second flip-flop produces the desired delta modulation signal.

3 Claims, 11 Drawing Figures

CIRCUIT ARRANGEMENT FOR HALVING THE SAMPLING RATE OF A DELTA MODULATION SIGNAL

The invention relates to a circuit arrangement for converting a first delta modulation signal with which a first sampling rate F is associated into a second delta modulation signal with which a second sampling rate is associated which is equal to ½F, the delta modulation signals characterizing one and the same information signal.

Such a circuit arrangement may, for example, be used in a transmission system in which analog signals are transmitted by means of delta modulation. Such a transmission system is sometimes a source of interferences which seriously affect the quality of the links, when transmission is effected with the maximum available transmission capacity. By reducing the bit rate, the width of the frequency band occupied by the transmitted digital signal is reduced so that the influence of the interferences is diminished and connections of an acceptable quality are maintained.

For reducing the sampling rate, the first delta modulation signal might thereto first be converted into an analog signal, whereafter this analog signal might again be sampled, but now with a lower sampling rate, and converted into a second delta modulation signal. The invention renders it possible to avoid these double conversions as there are the digital-to-analog and analog-to-digital conversion, and furnishes a simple digital circuit arrangement by means of which it is possible to derive, from the bits of the first delta modulation signal with which a sampling rate F is associated, the bits of a second delta modulation signal with which a sampling rate F/2 is associated, both signals characterizing one and the same analog signal.

In accordance with the invention said device comprises:

means for producing the two bits $b_{2n-1}$, $b_{2n-2}$, which, in the first delta modulation signal, precede each of the bits $b_{2n}$ occurring at instants 2nT with a rate F/2;

a first flip-flop;

first logic switching means for controlling the state of said first flip-flop and to which said bits $b_{2n-1}$ and $b_{2n-2}$ are applied and which change the state of the first flip-flop if both bits are unequal to one another;

a second flip-flop;

second logic switching means for controlling the state of said second flip-flop and to which said bits $b_{2n}$ ans $b_{2n-1}$ are applied for storing the bit $b_{2n}$ if the first flip-flop is in a first state and for storing the bit $b_{2n-1}$ if the first flip-flop is in a second state, the output of the second flip-flop producing the second delta modulation signal.

The circuit arrangement according to the invention can be implemented in an extremely simple manner, for example, by means of two exclusive OR-gates, connected to the first flip-flop, and two "AND"-gates and an "OR"-gate, connected to the second flip-flop.

It should be noted that the delta modulation signal applied to the arrangement may either be a linear or a non-linear delta modulation signal. The arrangement produces a delta modulation signal of the same format as its input signal.

The invention will be further explained with reference to the accompanying drawing.

FIG. 1 shows schematically an embodiment according to the invention.

Figure 2:
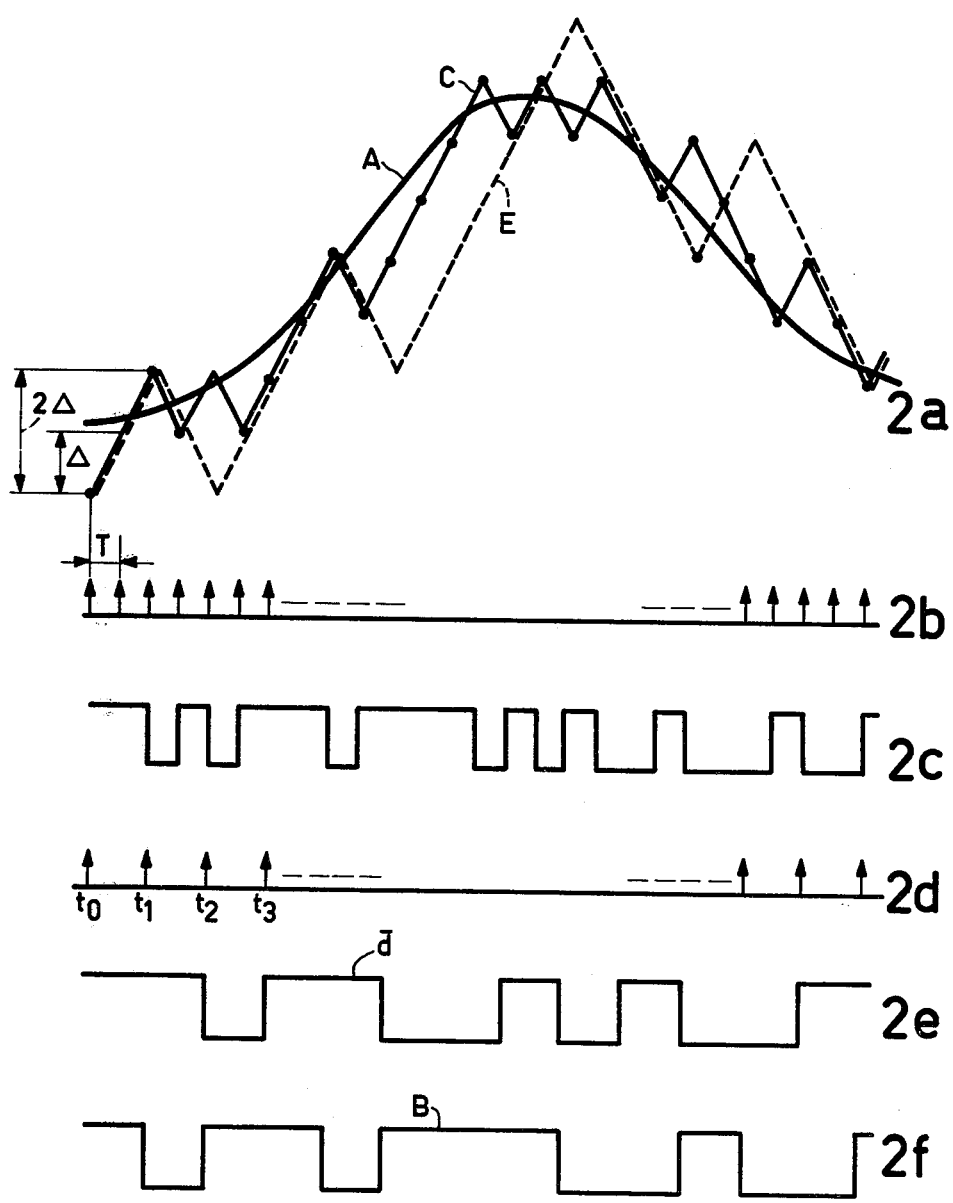

FIG. 2 comprised of 2a-2f, shows some diagrams for explaining the operation of the arrangement shown in FIG. 1.

Figure 3:
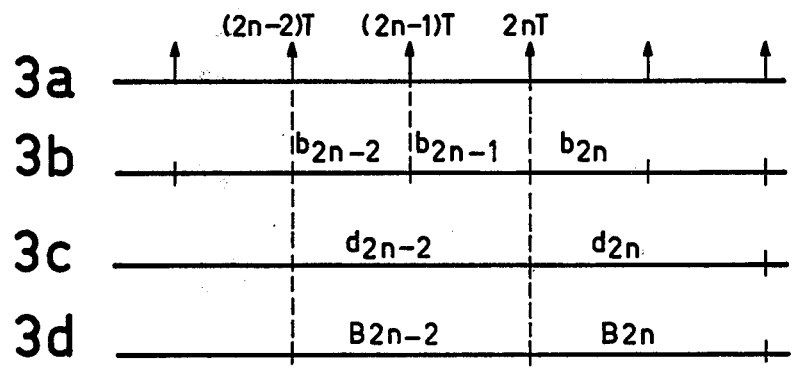

FIG. 3 comprised of 3a-3d, show schematically the meaning of the used notation.

The arrangement shown in FIG. 1 comprises a a delta modulation encoding device 1 to which an analog signal is applied through an input 2 and which produces, at its output 3, a delta modulation signal with which a sampling rate F is associated. The required sampling signal is produced by clock pulse generator 4.

In the diagram 2a of FIG. 2 the curve A represents the analog signal to be encoded. At sampling instants, indicated in the diagram 2b and separated by intervals T=1/F, the difference between the analog signal A and a comparison signal is determined. This comparison signal is illustrated by the curve C and represents the decoded output signal of the delta modulation encoding device. Depending on whether this difference is positive or negative, the encoding device produces a bit having the value "1" or "0," which is applied to a local receiver for increasing or decreasing the comparison signal with a slope whose absolute value is equal to $\Delta/T$. The term $\Delta$, called step size, is assumed to be fixed, so that the slope $\Delta/T$ is constant. The diagram 2c shows the output bits of the delta modulation encoder, said bits occurring at a rate F.

To convert the output signal of the delta modulation encoder 1, with which a sampling rate F is associated, into a delta modulation signal which would be obtained if a sampling signal would be applied in which the sampling pulses occur with a frequency ½F, the device shown in FIG. 1 comprises, in the first place, delay means which produce the bits $b_{2n-1}$ and $b_{2n-2}$ occurring in the output signal of the encoder 1, prior to the bits $b_{2n}$ occurring at a rate ½F and at the instants 2nT. These delay means are constituted by a shift register comprising the two shift register elements 5 and 6 which are connected in series to the output 3 of the encoder 1 and to which shift pulses, occurring at a rate F, are applied.

In the diagram 3a of FIG. 3 the solid arrows indicate the sampling instants (sampling rate is F). Three consecutive instants are herein indicated by 2nT, (2n−1)T, (2n−2)T, respectively. The delta modulating bits occurring at these instants are schematically shown in diagram 3b and indicated by $b_{2n}$, $b_{2n-1}$, $b_{2n-2}$. At the instants 2nT, at which the encoder 1 produces a bit $b_{2n}$ the two bits $b_{2n-1}$, $b_{2n-2}$ occur at the outputs of the elements 5 and 6.

The arrangement according to the invention also comprises a first flip-flop 7 to which clock pulses are applied which occur at a rate ½F. Said clock pulses occuring at said instants 2nT. In response to the occurrence of such clock pulse the state of this flip-flop may change; whether this flip-flop changes state depends on the bits $b_{2n-1}$ and $b_{2n-2}$. If the logic signal which characterizes the state of the flip-flop 7 and which occurs at its Q-output is represented by d, then at the instant 2nT the state of this flip-flop 7 is given by $d_{2n}$ and at the instant (2n−2)T, by $d_{2n-2}$. All this is shown in the diagram 3C of FIG. 3. At the instants 2nT where n=0, 1, 2, . . . the the flip-flop 7 is controlled so that:

$$\begin{cases} \text{If } b_{2n-1} = b_{2n-2}, d_{2n} = d_{2n-2} \\ \text{If } b_{2n-1} \neq b_{2n-2}, d_{2n} \neq d_{2n-2} \end{cases} \quad (1)$$

To realize the relations given in expression (1), the embodiment shown in FIG. 1 comprises a flip-flop 7 of the D-type. Applied to the D-input of this flip-flop is a digital control signal X obtained in the following manner: the bits $b_{2n-1}$ and $b_{2n-2}$, occurring, respectively, at the output of the shift register element 5 and the shift register element 6 are applied to an exclusive OR-gate circuit 9 which produces a logic signal S. This logic signal S is applied, together with the signal occurring at the Q-output of the flip-flop 7, to an exclusive OR-gate circuit 10, which produces the logic control signal X. The flip-flop 7 changes state at the instants at which the clock pulses of frequency F/2 occur. To this end these clock pulses are applied to the clock pulse input H of the flip-flop 7 and taken from a divide-by-two-divider 8 connected to the output of the clock pulse generator 4. Preferably, a delay circuit 11 is connected so between the divide-by-two-divider 8 and the input H of the flip-flop 7 that the clock pulses occurring with the rate F/2 are subjected to a delay $\tau_1$, $\tau_1$ being small relative to T. This time delay $\tau_1$ has for its purpose to apply a clock pulse to the input H of the flip-flop 7 but not before the control signal has been applied to the D-input of this flip-flop. However, for simplicity, it will be assumed in the following description that $\tau_1=0$.

The following table shows, as a function of the different values of the bits $b_{2n-1}$ and $b_{2n-2}$ and of the state $d_{2n-2}$ of the flip-flop 7, the values of the above-mentioned logic signals S and X and the new state $d_{2n}$ the flip-flop 7 assumes after the occurrence of a clock pulse at its input H. It will be readily understood that this table is equivalent to the logic conditions stated in (1)

| $b_{2n-2}$ | $b_{2n-1}$ | S | $d_{2n-2}$ | X | $d_{2n}$ |
|---|---|---|---|---|---|
| 0 | 0 | 0 | 0 | 0 | 0 |
| 0 | 1 | 1 | 1 | 0 | 0 |
| 1 | 0 | 1 | 0 | 1 | 1 |
| 1 | 1 | 0 | 1 | 1 | 1 |

The arrangement shown in FIG. 1 furthermore comprises a second flip-flop 12 to which clock pulses, which also occur at the instants 2nT and have a rate ½F are applied through a clock pulse input H. The bit $b_{2n}$ occurs at the Q-output of this flip-flop if the flip-flop 7 is in that state which corresponds to d32 0. Should the flip-flop 7 be in the state wherein d=1, the bit $b_{2n-1}$ occurs at the Q-output of flip-flop 12. If the logic signal which characterizes the state of this flip-flop 12 and occurs at its Q-output is represented by B, the state of this flip-flop 12 at the instant 2nT is given by $B_{2n}$ and at the instant $(2n-2)T$ by $B_{2n-2}$. All this is shown in the diagram 3d of FIG. 3. At the instants 2nT, where n=0, 1, 2, ... this flip-flop 12 is now controlled so that:

$$\begin{cases} \text{If } d_{2n} = 0, B_{2n} = b_{2n} \\ \text{If } d_{2n} = 1, B_{2n} = b_{2n-1} \end{cases} \quad (2)$$

To realize the relations given in expression (2), the embodiment shown in FIG. 1 comprises the two "AND"-gates 13 and 14 and the "OR"-gate 15. The "AND"-gate 13 has an input which is connected to the output $\overline{Q}$ of the flip-flop 7 and the other input is connected to the output 3 of the encoder 1. Thus, the signal $\overline{d}_{2n}$ and the bit $b_{2b}$ are applied to this AND-gate 13 at the instant 2nT. The AND-gate 14 has an input which is connected to the output Q of the flip-flop 7 and the other input is connected to the output of the shift register element 5. Thus the signal $d_{2n}$ and the bit $b_{2n-1}$ are applied to this AND-gate 14 at an instant 2nT. The two inputs of OR-gate 15 are connected to the outputs of the AND-gates 13 and 14 respectively, the outputs of the OR-gate being connected to the D-input of flip-flop 12. This flip-flop 12, also of the D-type, changes state at the instants at which the clock pulses occurring at the rate ½F are applied to the clock pulse input H. These clock-pulses, which are also applied to the clock pulse input H of the flip-flop 7, are, however, delayed by a delay circuit 16 for a time $\tau_2$ relative to the clock pulse applied to the flip-flop 7. It also holds here that $\tau_2$ is small relative to T. In the following description it will again be assumed, for simplicity, that $\tau_1=\tau_2=0$.

The signal B occurring at the Q-output of the flip-flop 12 now constitutes the desired delta modulation signal, that is to say the delta modulation which would be obtained if the analog signal were applied to a delta modulation encoder to which sampling pulses, occurring at a rate ½F, would be applied and wherein a step size 2Δ would be used, which step size is, consequently, twice as large as the step size used in the delta modulation encoder to which sampling pulses, occurring at a sampling rate F, are applied. FIG. 2 illustrates this, for further clarification, by means of a number of time diagrams. In the manner described above the analog signal A, shown in the diagram 2a, is converted into a delta modulation signal shown in the diagram 2c and with which a sampling rate F is associated (FIG. 2b shows the sampling instants). A comparison signal having a shape as shown by curve C in diagram 2a is produced in the delta modulation encoder 1.

If a sampling signal whose sampling pulses occur with a sampling rate ½F (see diagram 2d) were now applied applied to the delta modulation encoder 1 of FIG. 1, the delta modulation pulses shown in diagram 2f, each of these pulses how having a duration of 2/F=2T, appear at the output of the encoder 1. The comparison signal produced by these delta modulation pulses is illustrated by curve E in diagram 2a and is characterized in that the absolute value of the slope of the linear increase or decrease is equal to 2Δ/2T=Δ/T. This slope is the same absolute value as the slope of the comparison signal illustrated by curve C in the diagram 2a.

To check whether the device shown in FIG. 1 produces the same delta modulation signal, diagram 2e shows the signal $\overline{d}$ occurring at the $\overline{Q}$-output of the flip-flop 7. It is assumed that at the sampling instant $t_o$ flip-flop 7 is in (or has been set into) such a state that d=0, that is to say $\overline{d}=1$. By applying the expressions (1) it appears that, at the next sampling instant $t_1$, the state of the flip-flop 7 is retained, as the two bits preceding the bit occurring at the instant $t_1$ are equal (see diagram 2c). So the signal $\overline{d}$ remains equal to "1" until the next sampling instant $t_2$. As this instant $t_2$ the state of the flip-flop 7 is changed because the two preceding bits occurring in the signal shown in diagram 2c are unequal to one other, so that it holds that $\overline{d}=0$ until the next sampling instant $t_3$ etc.

By now subjecting the signal $\overline{d}$ to the expressions (2), the signal B, illustrated in diagram 2f, is obtained which represents on the one hand the state of the flip-flop 12 and on the other hand the delta modulation signal with which a frequency $\frac{1}{2}F$ is associated. Thus, the signal shown in diagram 2f represents both the output signal of the device shown in FIG. 1 and the output signal of the delta modulation encoder with which a sampling frequency $\frac{1}{2}F$ is associated and a step size $2\Delta$.

The operation of the device shown in FIG. 1 can now be interpreted as follows: the deviation between the comparison signals C and E can only have three possible values, namely 0, $+2\Delta$ or $-2\Delta$. The state of the flip-flop 7 is now characteristic of the value of this deviation at the instants 2nT. If at such an instant the deviation between the two curves C and E is equal to 0, the flip-flop 7 is set to the state $d=0$ and if this deviation is equal to $+2\Delta$ or $-2\Delta$, the flip-flop 7 is set to the state $d=1$ As the the absolute value of the deviation between the two comparison signals and the sampling instants 2nT cannot exceed $2\Delta$, the bit to be transmitted at this instant 2nT, at which the deviation is equal to $+2\Delta$ or $-2\Delta$ (state $d=1$ of the flip-flop 7), must be so that at the next sampling instant $2(n+1)T$ this deviation is maintained or reduced to zero: this is obtained by transmitting at each instant at which the flip-flop 7 is in the state "1," a bit of the same value as the bit $b_{2n-1}$ in the output signal of the delta modulation encoder 1. At each of the sampling instants 2nT at which the deviation is equal to zero (state $d=0$ of the flip-flop 7), the bit $b_{2n}$ to be transmitted is assumed to be equal to $b_{2n}$.

What is claimed is:

1. A circuit arrangement for converting a first series of delta modulation pulses occurring at a rate F, into a second series of delta modulation pulses occurring at a rate F/2, said circuit arrangement comprising:

means responsive to said first series for simultaneously producing three successive delta modulation pulses of said first series;

means responsive to a first and a second of said three simultaneously produced delta modulation pulses for providing a first signal when these two delta modulation pulses have equal values and for providing a second signal when these two delta modulation pulses have unequal values;

a clockpulse controlled flip-flop;

means for applying said first and second signal to said flip-flop;

means responsively coupled to said simultaneously producing means and to said flip-flop for selectively supplying the second or the third of said simultaneously occurring delta modulation pulses; and clockpulse controlled transfer circuit means responsively coupled to said selectively supplying means for transferring the selectively supplied delta modulation pulse to the output of the circuit arrangement, whereby the delta modulation pulses of the first series thus transferred comprise said second delta modulation series.

2. Circuit arrangement as claimed in claim 1, wherein said producing means comprises a first exclusive OR-gate circuit having inputs to which the first and second pulses are applied; said applying means comprising a second exclusive OR-gate circuit having a first input coupled to the output of the first exclusive OR-gate circuit, a second input coupled to an output of the flip-flop, and an output which produces the signal for controlling the state of the flip-flop.

3. A circuit arrangement as claimed in claim 1, wherein said selectively supplying means comprises gates coupled to the mutually complementary outputs of the flip-flop and to which the first and second pulses are applied respectively, and an OR-gate coupled to the outputs of said two AND-gates, said OR-gate producing the signal for controlling the state of the transfer circuit means.

* * * * *